(12) United States Patent
Matsuda

(10) Patent No.: US 7,969,487 B2
(45) Date of Patent: Jun. 28, 2011

(54) SOLID-STATE IMAGING APPARATUS

(75) Inventor: Seisuke Matsuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 459 days.

(21) Appl. No.: 12/129,100

(22) Filed: May 29, 2008

(65) Prior Publication Data

US 2008/0297627 A1 Dec. 4, 2008

(30) Foreign Application Priority Data

May 30, 2007 (JP) ................................ 2007-143135

(51) Int. Cl.
*H04N 9/64* (2006.01)
*H04N 3/14* (2006.01)
(52) U.S. Cl. ........................................ 348/243; 348/300
(58) Field of Classification Search .......... 348/243–245, 348/300, 308
See application file for complete search history.

(56) References Cited

U.S. PATENT DOCUMENTS

| 7,508,433 | B2 * | 3/2009 | Koseki et al. ................ 348/300 |
| 2005/0083420 | A1 * | 4/2005 | Koseki et al. ................ 348/294 |

FOREIGN PATENT DOCUMENTS

JP 2005-143078 A 6/2005

* cited by examiner

*Primary Examiner* — Nicholas G Giles
*Assistant Examiner* — Dillion Durnford-Geszvain
(74) *Attorney, Agent, or Firm* — Westerman, Hattori, Daniels & Adrian, LLP

(57) ABSTRACT

A solid-state imaging apparatus including: a pixel section having pixels two-dimensionally arranged into row direction and column direction, each pixel containing a photoelectric conversion section, an accumulation section for accumulating output of the photoelectric conversion section, an amplification section for amplifying output of the photoelectric conversion section accumulated at the accumulation section and outputting it as pixel signal, and a reset section for effecting reset of the accumulation section; a vertical scanning section for selecting row to be read out of the pixel section; vertical signal lines provided correspondingly to columns of the pixel section, onto which pixel signals of pixels arranged in column direction are outputted; a column amplifier section for effecting suppression of dark current component of the pixels contained in pixel signals inputted through the vertical signal line and for amplifying the pixel signals after the suppression; a horizontal scanning section for selecting the pixel signal amplified by the column amplifier section and outputting it onto a horizontal signal line; and a dark current correction signal generation section for generating and applying on the column amplifier section a signal for suppressing the dark current component based on the pixel signal from the horizontal signal line.

4 Claims, 13 Drawing Sheets

SOLID-STATE IMAGING APPARATUS

This application claims benefit of Japanese Patent Application No.2007-143135 filed in Japan on May 30, 2007, the contents of which are incorporated by this reference.

BACKGROUND OF THE INVENTION

The present invention relates to solid-state imaging apparatus, and more particularly relates to solid-state imaging apparatus using amplified MOS sensor.

Among the solid-state imaging apparatus in recent years, those solid-state imaging apparatus referred to as amplified MOS sensor are mounted on low power-consumption solid-state imaging apparatus to be used in mobile equipment or on high-resolution electronic still cameras. For existing solid-state imaging apparatus using amplified MOS sensor, methods of reading pixel area by the unit of row and effecting parallel processing with using column amplifiers that are provided for each column have been proposed to concurrently attain an increase in the number of pixels, higher frame rate, and lower noise. Systems capable of black level correction at column amplifier have also been proposed to further reduce noise.

In FIG. 1, solid-state imaging apparatus as disclosed in Japanese Patent Application Laid-Open 2005-143078 is cited as an example of solid-state imaging apparatus having construction of the above described system where black level correction is possible at the column amplifier. Specifically, the solid-state imaging apparatus shown in FIG. 1 includes: a pixel section 2 where pixel cells 1 are two-dimensionally disposed in row direction and column direction; a vertical scanning section 3 for selecting row to be read out of the pixel section 2; a vertical signal line 8 for outputting pixel signal by the unit of row from the pixel section 2; a column amplifier section 5 connected to the vertical signal line 8 to amplify pixel signal; a column amplifier drive section 4 for controlling operation of the column amplifier section 5; a horizontal select section 6 for outputting signal amplified at the column amplifier section 5; a horizontal scanning section 7 for selecting column to be read out of the horizontal select section 6; horizontal signal lines 9-1 to 9-n; a multiplexer 11 for selecting one of the horizontal signal lines 9-1 to 9-n; a multiplexer output terminal 12 for outputting signal selected at the multiplexer 11; and a black level control section 10 for controlling voltage to be applied on the column amplifier section 5 based on black level signal of the multiplexer output terminal 12. It should be noted that what is denoted by 8a in FIG. 1 is a bias current supply connected to the vertical signal line 8.

The pixel cell 1 includes: a photodiode PD serving as photoelectric conversion section; a transfer transistor M1 for transferring electric charge generated at photodiode PD to a accumulation section FD; a reset transistor M2 for resetting electric charge signal accumulated at the accumulation section FD; an amplification transistor M3 for amplifying the read out electric charge signal; and a row select transistor M4 for selecting each row.

The vertical scanning section 3 is to output: transfer control signal $\phi$ TX1, $\phi$ TX2 for controlling operation of the transfer transistor M1; reset control signal $\phi$ RS1, $\phi$ RS2 for controlling operation of the reset transistor M2; and row select control signal $\phi$ SEL1, $\phi$ SEL2 for controlling operation of the row select transistor M4. It should be noted that the pixel section 2 in this case is constructed by two pixel rows.

The column amplifier section 9 for each unit column includes: an inverting amplifier A11; a clamp capacitor C11 for retaining reset component of pixel signal; a feedback capacitor C12 for amplifying pixel signal; a sample-and-hold switch SW10 for connecting between the clamp capacitor C11 and an input terminal of the inverting amplifier A11; a switch for precharge SW12 for applying on the feedback capacitor C12 a clamp voltage Vcp which is an output voltage of the black level control section 10; a reset switch SW11 for resetting the clamp capacitor C11; a feedback capacitor connecting switch SW13 for connecting between the feedback capacitor C12 and an output terminal of the inverting amplifier A11; and a switch for hold SW14 for connecting output potential of the inverting amplifier A11 to a hold voltage supply Vhd which has a constant value.

The column amplifier drive section 4 outputs: a sample-and-hold control signal $\phi$ SH10 for controlling operation of the sample-and-hold switch SW10; an inverting amplifier reset control signal $\phi$ CL11 for controlling operation of the reset switch for inverting amplifier SW11; precharge control signal $\phi$ CL12 for controlling operation of the precharge switch SW12; and a feedback capacitor connection control signal $\phi$ SH11 for controlling operation of the feedback capacitor connection switch SW13.

FIG. 2 schematically shows drive timing. Shown here is case where a first row from the upper side of the pixel section 2 is selected by the vertical scanning section 3. At first, a reset level is outputted from the pixel cell 1. In particular, the row select transistor M4 is first turned ON by driving the row select control signal $\phi$ SEL1 to H level to connect the first pixel row to the vertical signal line 8. At the same time, after once turning ON the reset transistor M2 by driving the reset control signal $\phi$ RS1 to H level, the reset control signal $\phi$ RS1 is brought to L level to turn OFF the reset transistor M2. A reset level of pixel is thereby outputted onto the vertical signal line 8. The output voltage on vertical signal line 8 (V8) when pixel is in reset condition is referred to as Voff.

The operation of the column amplifier section 5 at this time will now be described by way of an example of the column amplifier on the left end. At first, inverting amplifier bias control signal $\phi$ P1 outputted from the horizontal scanning section 7 is driven to H level to bring the inverting amplifier A11 into its operating condition, and at the same time the hold switch SW14 is tuned OFF to disconnect an output terminal VA11 of the inverting amplifier A11 from the hold power supply Vhd. At the same time, the sample-and-hold switch SW10 is turned ON by driving the sample-and-hold control signal $\phi$ SH10 to H level to connect between the clamp capacitor C11 and the input terminal of the inverting amplifier A11. In addition, the reset switch SW11 is turned ON by driving the inverting amplifier reset control signal $\phi$ CL11 to H level to connect between the input terminal and the output terminal of the inverting amplifier A11. Further, the precharge control signal $\phi$ CL12 is driven to H level and the feedback capacitor connection control signal $\phi$ SH11 is brought to L level to turn ON the precharge switch SW12 so as to connect the feedback capacitor C12 to the clamp voltage Vcp. At the time of precharge, the output side voltage Vc12(pc) of the feedback capacitor C12 and output voltage VA11(pc) of the inverting amplifier A11 are represented by the following equations (1), (2).

$$Vc12(pc)=Vcp \qquad (1)$$

$$VA11(pc)=Vat \qquad (2)$$

where Vat is reset voltage when the input terminal and the output terminal of the inverting amplifier A11 are connected to each other.

At this time, the clamp capacitor C11 retains output voltage Voff of the vertical signal line 8 in reset condition on the basis of reset voltage Vat of the inverting amplifier A11. Further, feedback capacitor C12 retains clamp voltage Vcp on the basis of reset voltage Vat of the inverting amplifier A11. Subsequently, the reset switch SW11 is turned OFF by bringing the inverting amplifier reset control signal φ CL11 to L level to disconnect between the input terminal and the output terminal of the inverting amplifier A11. At the same time, the precharge switch SW12 is turned OFF by bringing the precharge control signal φ CL12 to L level to disconnect the feedback capacitor C12 from the clamp voltage Vcp.

Subsequent to this, the feedback capacitor connection switch SW13 is turned ON by driving the feedback capacitor connection control signal φ SH11 to H level to connect between the feedback capacitor C12 and the output terminal of the inverting amplifier A11. At this time, a feedback loop is formed of the inverting amplifier A11 through the feedback capacitor C12, whereby the input terminal of the inverting amplifier A11 remains at Vat, and the output voltage VA11 of the inverting amplifier A11 attains the voltage accumulated at the feedback capacitor C12. Supposing this condition as reset condition, output voltage VA11(rst) of the inverting amplifier A11 in reset condition is obtained by the following equation (3).

$$VA11(rst)=Vat+(Vcp-Vat)=Vcp \qquad (3)$$

Next, signal level is outputted from the pixel cell 1. At first, in the condition where connection between the first pixel row and the vertical signal line 8 is kept by continuing H level of row select control signal φ SEL1, after turning ON the transfer transistor M1 by driving transfer control signal φ TX1 to H level to read signal electric charge accumulated at photodiode PD, the transfer control signal φ TX1 is brought to L level to turn OFF the transfer transistor M1. The signal level of pixel is thereby outputted onto the vertical signal line 8 through the amplification transistor M3 and the row select transistor M4. Supposing (−Vsig) as change in output voltage of the vertical signal line 8 from its reset condition to signal level condition, the output voltage of the vertical signal line 8 in its signal level condition is (Voff−Vsig).

The operation of the column amplifier section 5 at this time will now be described by way of an example of the column amplifier on the left end. When the vertical signal line 8 is changed corresponding to (−Vsig), since the inverting amplifier A11, clamp capacitor C11, and feedback capacitor C12 act as amplifier having an amplification factor (−C11/C12), the output voltage VA11(sig) of the inverting amplifier in its signal level condition is obtained by the following equation (4).

$$\begin{aligned} VA11(sig) &= Vcp+(-C11/C12)\times(-Vsig) \qquad (4) \\ &= Vcp+(C11/C12)\times(Vsig) \end{aligned}$$

Subsequently, the sample-and-hold control signal φ SH10 is brought to L level to turn OFF the sample-and-hold switch SW10 so that signal read period from pixel is ended by disconnecting between the clamp capacitor C11 and the input terminal of the inverting amplifier A11. Here, setting to an optimum black level is possible by adjusting the clamp voltage Vcp which is the output voltage of the black level control section 10. Further, by using variable capacitance device as the feedback capacitor C12 to make amplification factor variable, sufficient signal amplitude is obtained and favorable SN can be secured even when pixel signal level is small.

Next in reading signal from the column amplifier section 5 out to the horizontal signal line 9-1 to 9-n, read is effected sequentially from each column through the horizontal select switch SW21 selected by horizontal select signals φ H1, φ H2, . . . from the horizontal scanning section 7. At this time, inverting amplifier bias control signals φ P1 to φ Pn are sequentially driven to H-level condition to sequentially turn ON the inverting amplifier A11 of each column so that the horizontal signal lines 9-1 to 9-n are driven by the output of the inverting amplifier A11 itself.

SUMMARY OF THE INVENTION

In accordance with a first aspect of the invention, there is provided a solid-state imaging apparatus including: a pixel section having pixels two-dimensionally arranged into row direction and column direction, each pixel containing a photoelectric conversion section, an accumulation section for accumulating output of the photoelectric conversion section, an amplification section for amplifying output of the photoelectric conversion section accumulated at the accumulation section and outputting it as pixel signal, and a reset section for effecting reset of the accumulation section; a vertical scanning section for selecting row to be read out of the pixel section; vertical signal lines provided correspondingly to columns of the pixel section onto which pixel signals of pixels arranged in column direction are outputted; a column amplifier section for effecting suppression of dark current component of the pixels contained in pixel signals inputted through the vertical signal line and for amplifying the pixel signals after the suppression; a horizontal scanning section for selecting the pixel signal amplified by the column amplifier section and outputting it onto a horizontal signal line; and a dark current correction signal generation section for generating and applying on the column amplifier section a signal for suppressing the dark current component based on the pixel signal from the horizontal signal line.

In a second aspect of the invention, the column amplifier section in the solid-state imaging apparatus according to the first aspect includes: an amplifier unit having an input end and an output end for amplifying and outputting from the output end an output conforming to a difference signal in relation to a second level of the pixel signal corresponding to output of the photoelectric conversion section accumulated at the accumulation section on the basis of a first level of the pixel signal at the time of the reset inputted from the input end; and a suppression signal application unit disposed in series between the vertical signal line and the amplifier unit for applying on the input end the signal for suppressing the dark current component after generation of the difference signal.

In a third aspect of the invention, the column amplifier section in the solid-state imaging apparatus according to the first aspect includes: an amplifier unit having an input end and an output end for amplifying and outputting from the output end an output conforming to a difference signal in relation to a second level of the pixel signal corresponding to output of the photoelectric conversion section accumulated at the accumulation section on the basis of a first level of the pixel signal at the time of the reset inputted from the input end; and a suppression signal application unit for applying the signal for suppressing the dark current component to the inside of the amplifier unit in the vicinity of the input end at the time of amplification of the output conforming to the difference signal.

In a fourth aspect of the invention, the solid-state imaging apparatus according to any one of the first to third aspects further includes AD conversion section for converting the pixel signal outputted from the horizontal signal line into a digital signal, wherein the dark current correction signal generation section generates the signal for suppressing the dark current component based on the digital signal.

DESCRIPTION OF THE PREFERRED EMBODIMENTS

Some embodiments of the solid-state imaging apparatus according to the invention will be described below with reference to the drawings.

Embodiment 1

Figure 3:
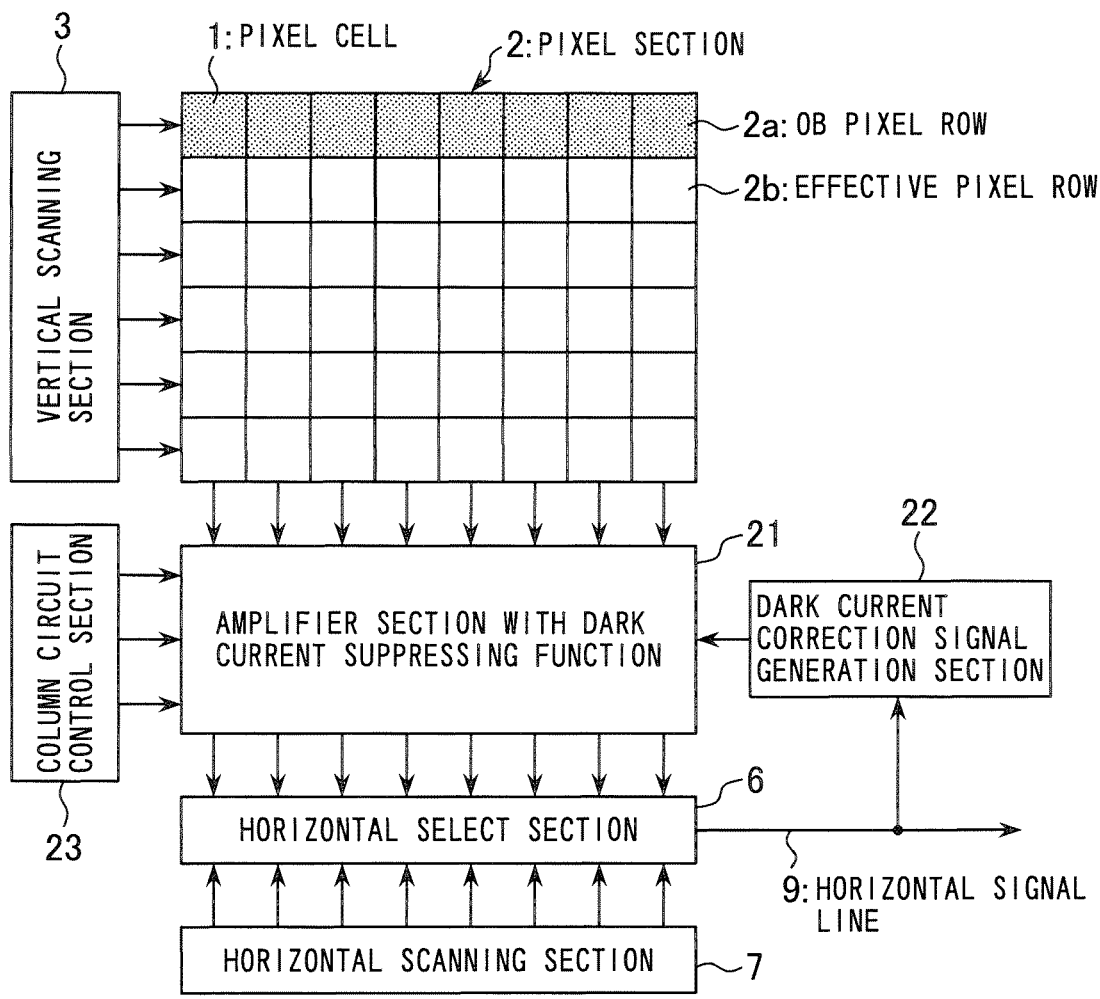
FIG. 3 is a block diagram schematically showing construction of a first embodiment of the solid-state imaging apparatus according to the invention.

A first embodiment of the solid-state imaging apparatus according to the invention will now be described with reference to the drawings. FIG. 3 is a block diagram showing construction of the solid-state imaging apparatus using amplified MOS sensor according to the first embodiment; it is different from the prior-art example shown in FIG. 1 in that a column circuit control section 23, an amplifier section 21 having dark current suppressing function, and a dark current correction signal generation section 22 are provided instead of the column amplifier drive section 4, column amplifier section 5, and black level control section 10. In the first embodiment shown in FIG. 3, a dark current level is previously detected at the dark current correction signal generation section 22, and such a signal as to suppress the dark current level is applied on the amplifier section with dark current suppressing function 21 to thereby amplify only signal component at the column amplifier.

Figure 1:
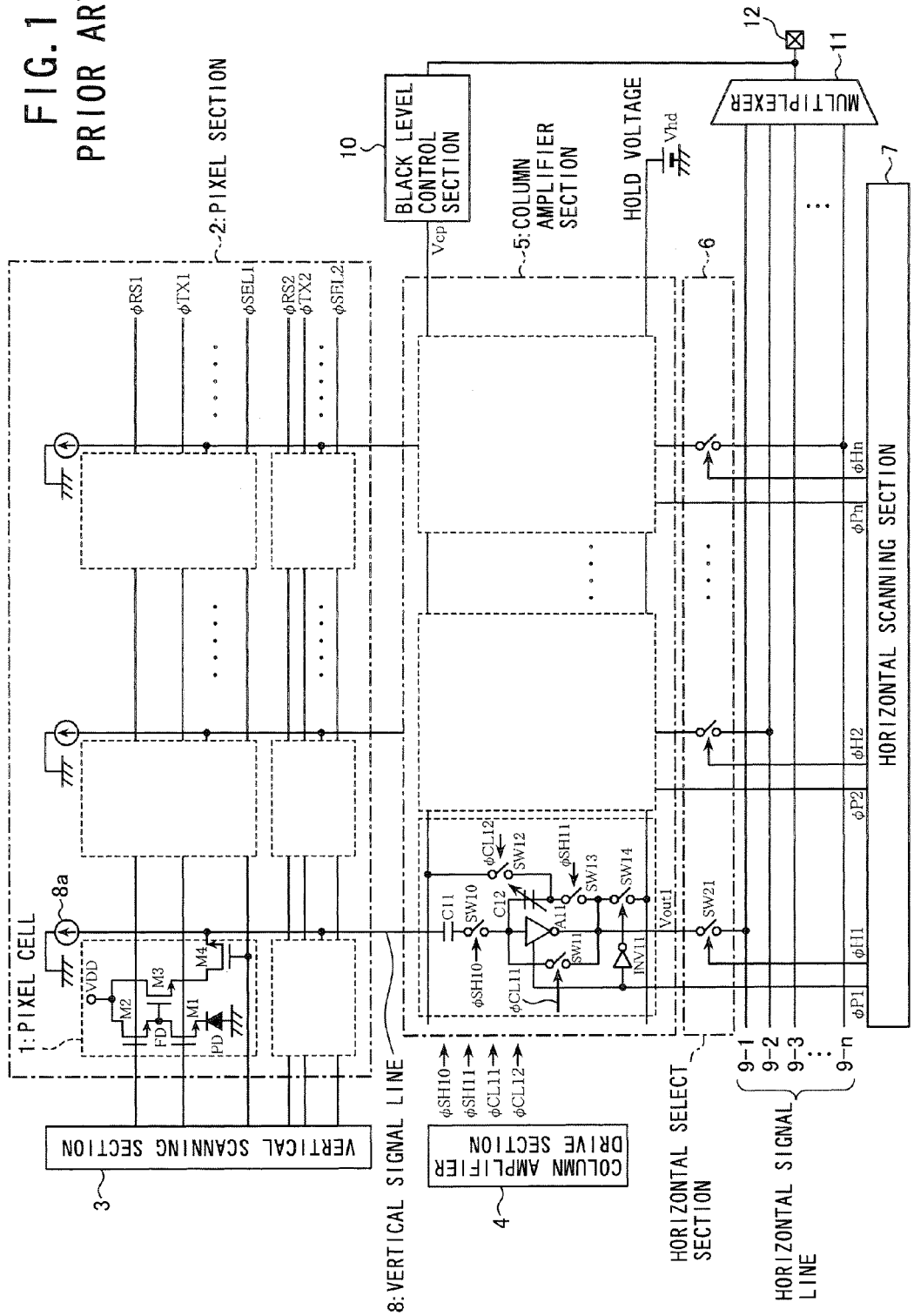
FIG. 1 is a circuit diagram showing partially in blocks an example of construction of prior-art solid-state imaging apparatus.
Figure 2:
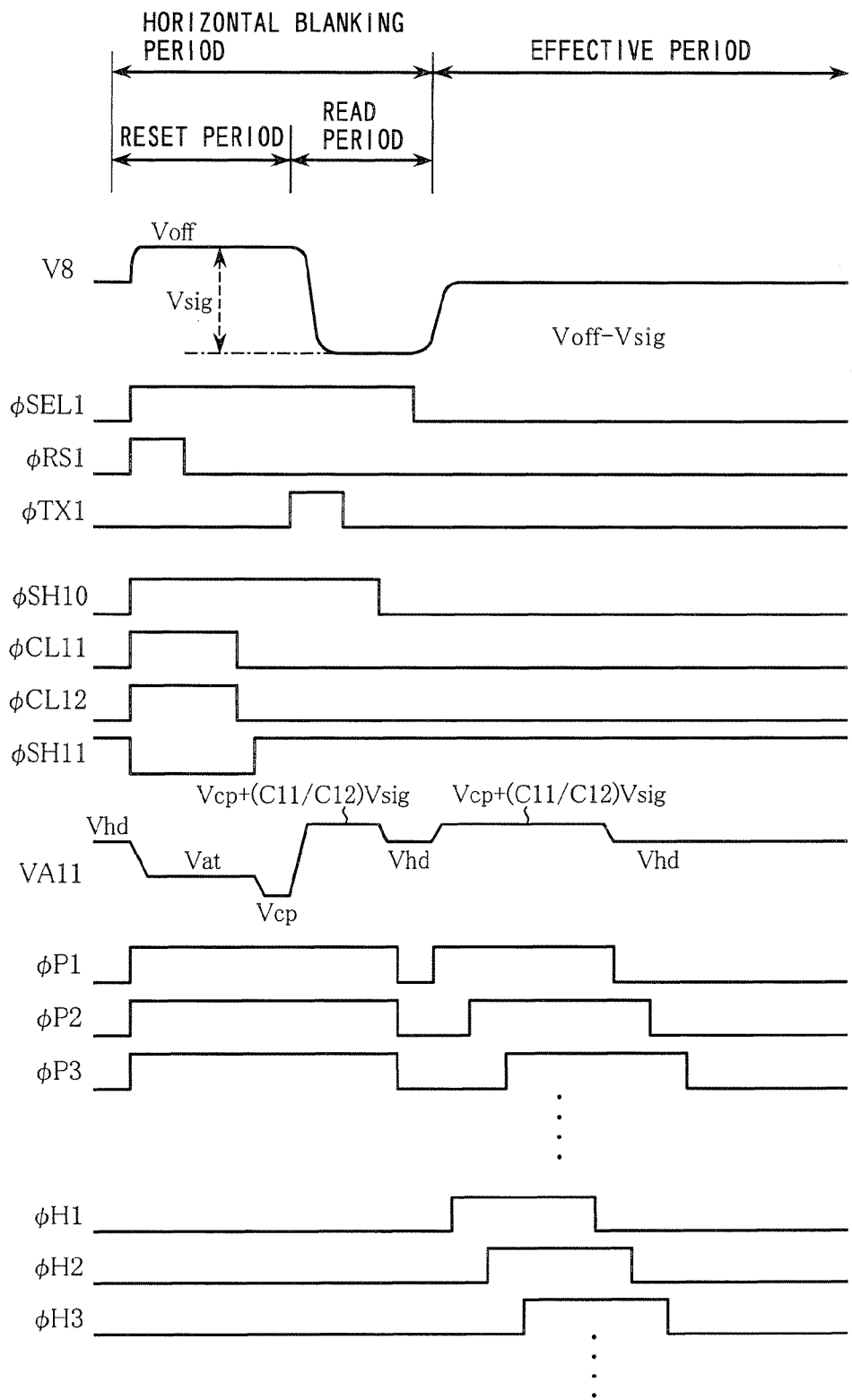
FIG. 2 shows drive timing to explain operation of the prior-art example shown in FIG. 1.
Figure 4:
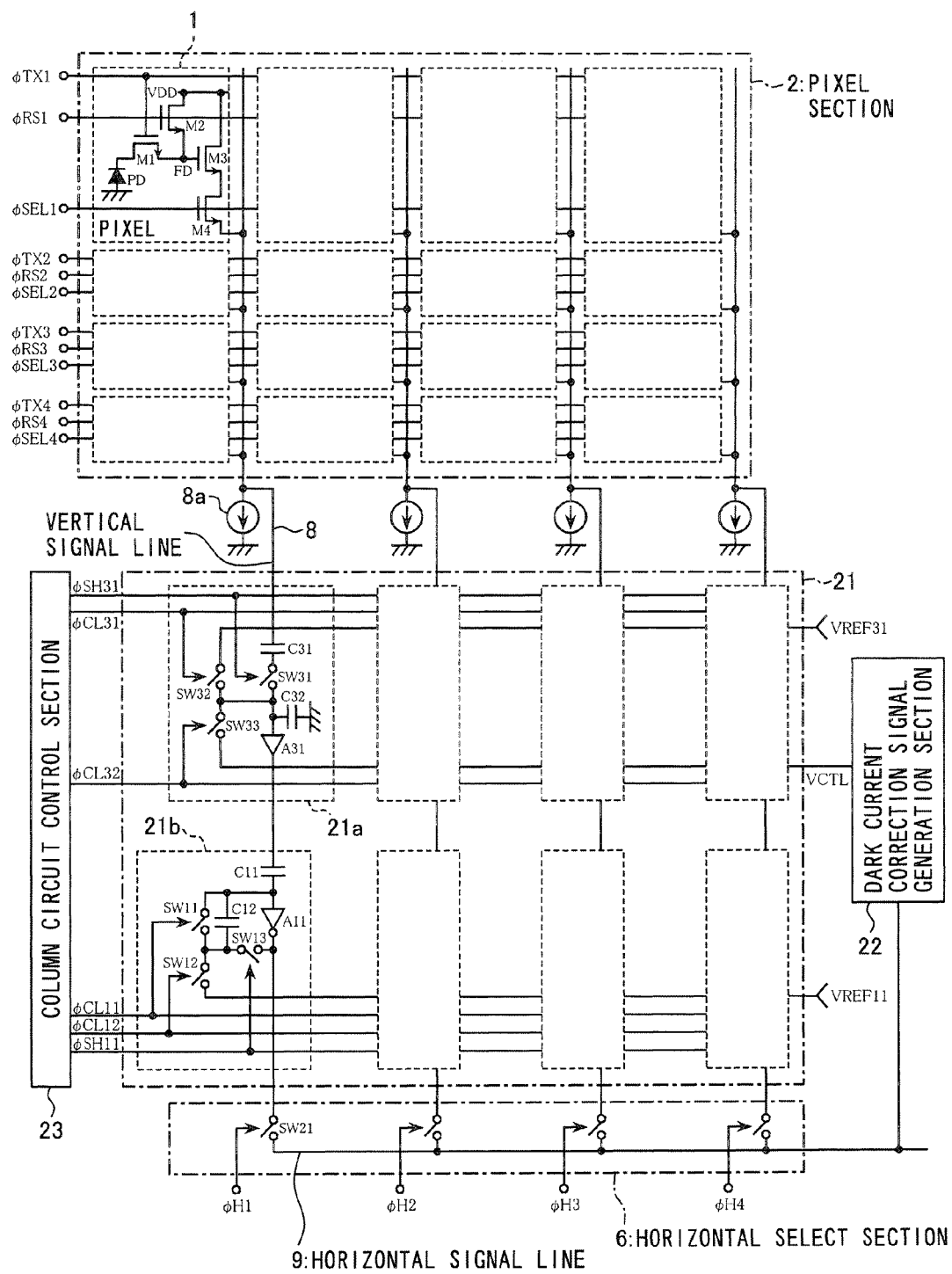
FIG. 4 is a circuit diagram showing a detailed construction of a pixel section and amplifier section having dark current suppressing function in the first embodiment shown in FIG. 3.

FIG. 4 is a circuit diagram for explaining operation of a pixel section 2, column circuit control section 23, amplifier section with dark current suppressing function 21, and dark current correction signal generation section 22 in the first embodiment shown in FIG. 3. Those components identical as those in the prior-art example shown in FIG. 1 are denoted by identical reference numerals. As shown in FIGS. 3 and 4, the solid-state imaging apparatus according to this embodiment includes: the pixel section 2 where pixel cells 1 are arranged into row direction and column direction, or into 4 rows by 4 columns in the illustrated example shown in FIG. 4; a vertical scanning section 3 for selecting row to be read out of the pixel section 2; a vertical signal line 8 for outputting pixel signal by the unit of column from the pixel section 2; the amplifier section with dark current suppressing function 21 connected to the vertical signal line 8 for amplifying pixel signal; the column circuit control section 23 for controlling operation of the amplifier section with dark current suppressing function 21; a horizontal select section 6 for outputting signal amplified at the amplifier section with dark current suppressing function 21; a horizontal scanning circuit 7 for selecting column to be read out of the horizontal select section 6; a horizontal signal line 9; and a dark current correction signal generation section 22 for controlling voltage to be applied on the amplifier section with dark current suppressing function 21 from black level signal of the horizontal signal line 9.

The vertical scanning section 3 is to output: transfer control signal φ TX1 to φ TX4 for controlling operation of transfer transistor M1 of the pixel cell 1; reset control signal φ RS1 to φ RS4 for controlling operation of reset transistor M2; and row select control signal φ SEL1 to φ SEL4 for controlling operation of row select transistor M4.

The amplifier section with dark current suppressing function 21 includes: a dark current suppressing clamp capacitor C31 for retaining reset component of pixel signal by each unit column; a dark current suppressing sampling capacitor C32 for sampling difference voltage between reset component and signal component; a dark current suppressing sampling switch SW31 for connecting between the dark current suppressing clamp capacitor C31 and the dark current suppression sampling capacitor C32; a reference voltage reset switch SW32 for resetting the dark current suppressing clamp capacitor C31 and the dark current suppressing sampling capacitor C32 to reference voltage VREF31; a dark current suppressing reset switch SW33 for resetting the dark current suppressing clamp capacitor C31 and the dark current suppressing sampling capacitor C32 to dark current suppressing voltage VCTL; a follower amplifier A31 for outputting voltage of the dark current suppressing sampling capacitor C32 at low impedance; an inverting amplifier A11; a clamp capacitor C11 for retaining signal level of the dark current suppressing sampling capacitor C32; a feedback capacitor C12 for amplifying change in output signal of the follower amplifier A31; a precharge switch SW12 for applying reference voltage VREF11 on the feedback capacitor C12; a reset switch for inverting amplifier SW11 for resetting the clamp capacitor C11; and a feedback capacitor connection switch SW13 for connecting the feedback capacitor C12 to an output terminal of the inverting amplifier A11.

It should be noted that a suppressing signal application unit 21a is formed of the dark current suppressing clamp capacitor C31, dark current suppressing sampling capacitor C32, dark current suppressing sampling switch SW31, reference voltage reset switch SW32, dark current suppressing reset switch SW33, and follower amplifier A31. Further an amplifier unit 21b is formed of the inverting amplifier A11, clamp capacitor C11, feedback capacitor C12, precharge switch SW12, inverting amplifier reset switch SW1, and feedback capacitor connection switch SW13.

The column circuit control section 23 is to output: dark current suppressing sampling control signal φ SH31 for controlling operation of the dark current suppressing sampling switch SW31; reference voltage reset control signal φ CL31 for controlling operation of the reference voltage reset switch SW32; dark current suppressing reset control signal φ CL32 for controlling operation of the dark current suppressing reset switch SW33; inverting amplifier reset control signal φ CL11 for controlling operation of the inverting amplifier reset switch SW11; precharge control signal φ CL12 for controlling operation of the precharge switch φ SW12; and feedback capacitor connection control signal φ SH11 for controlling operation of the feedback capacitor connection switch SW13.

Figure 5:
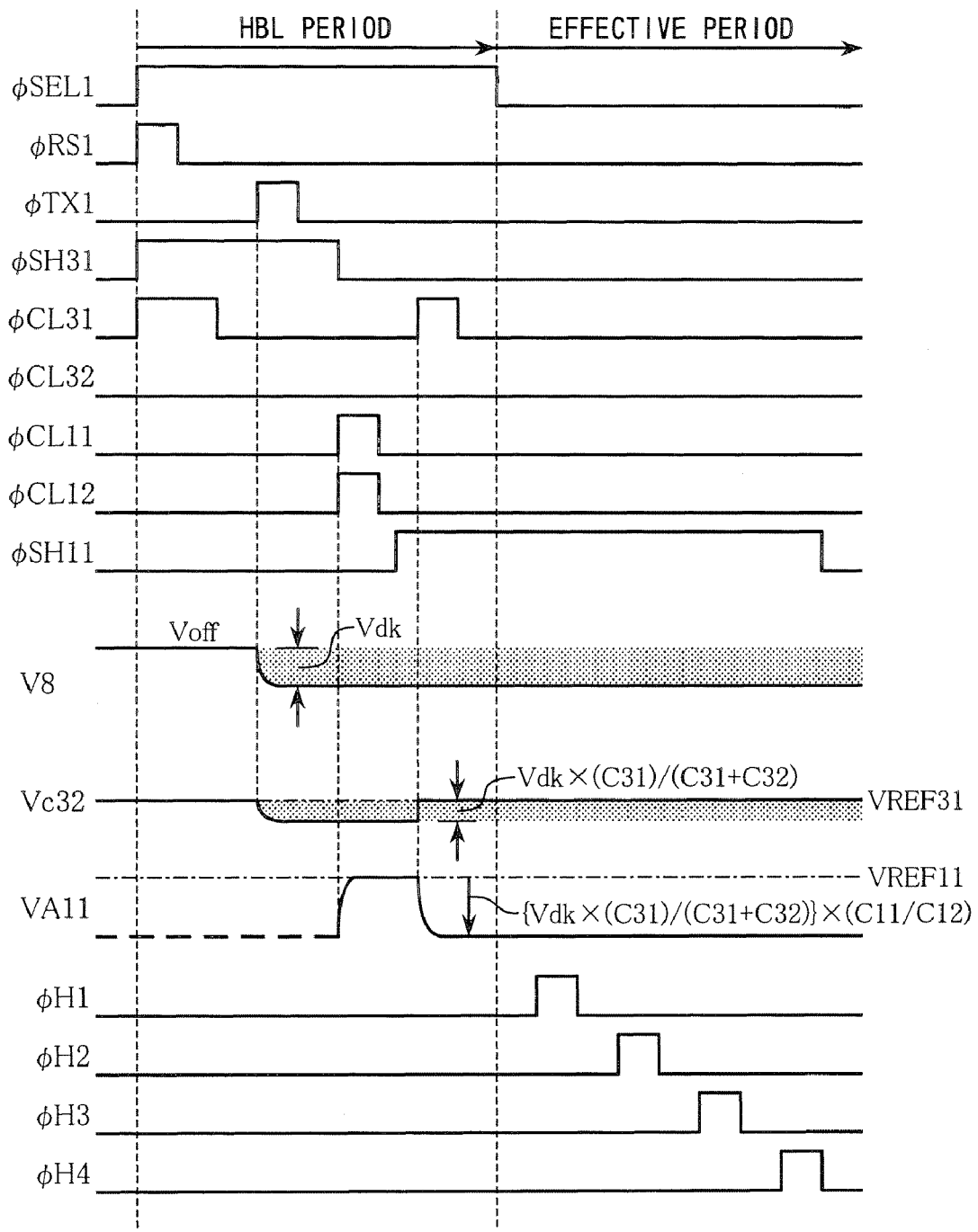
FIG. 5 shows drive timing to explain operation at the time of selecting OB pixel row of the pixel section shown in FIG. 4.
Figure 6:
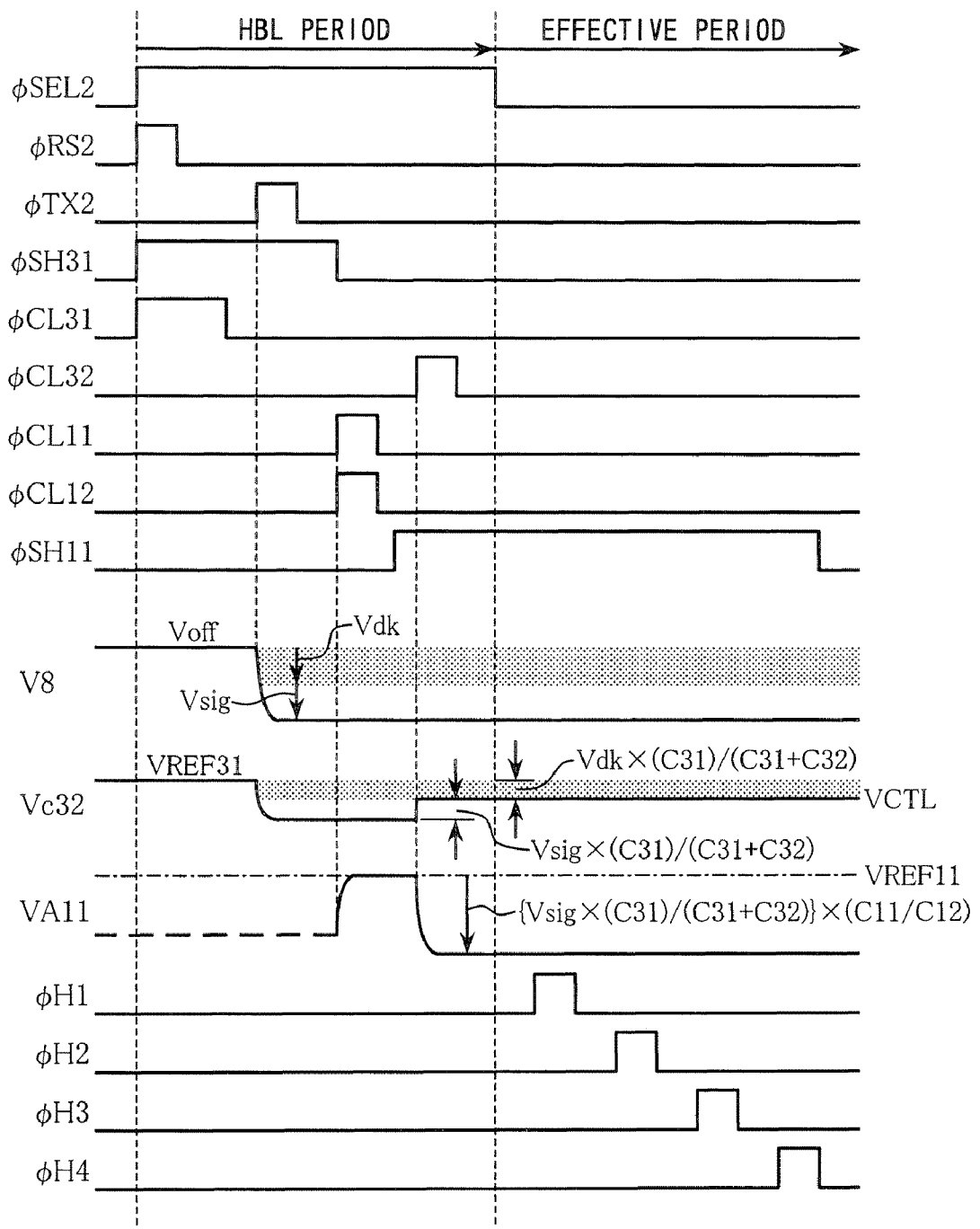
FIG. 6 shows drive timing to explain operation at the time of selecting effective pixel row of the pixel section shown in FIG. 4.
Figure 7:
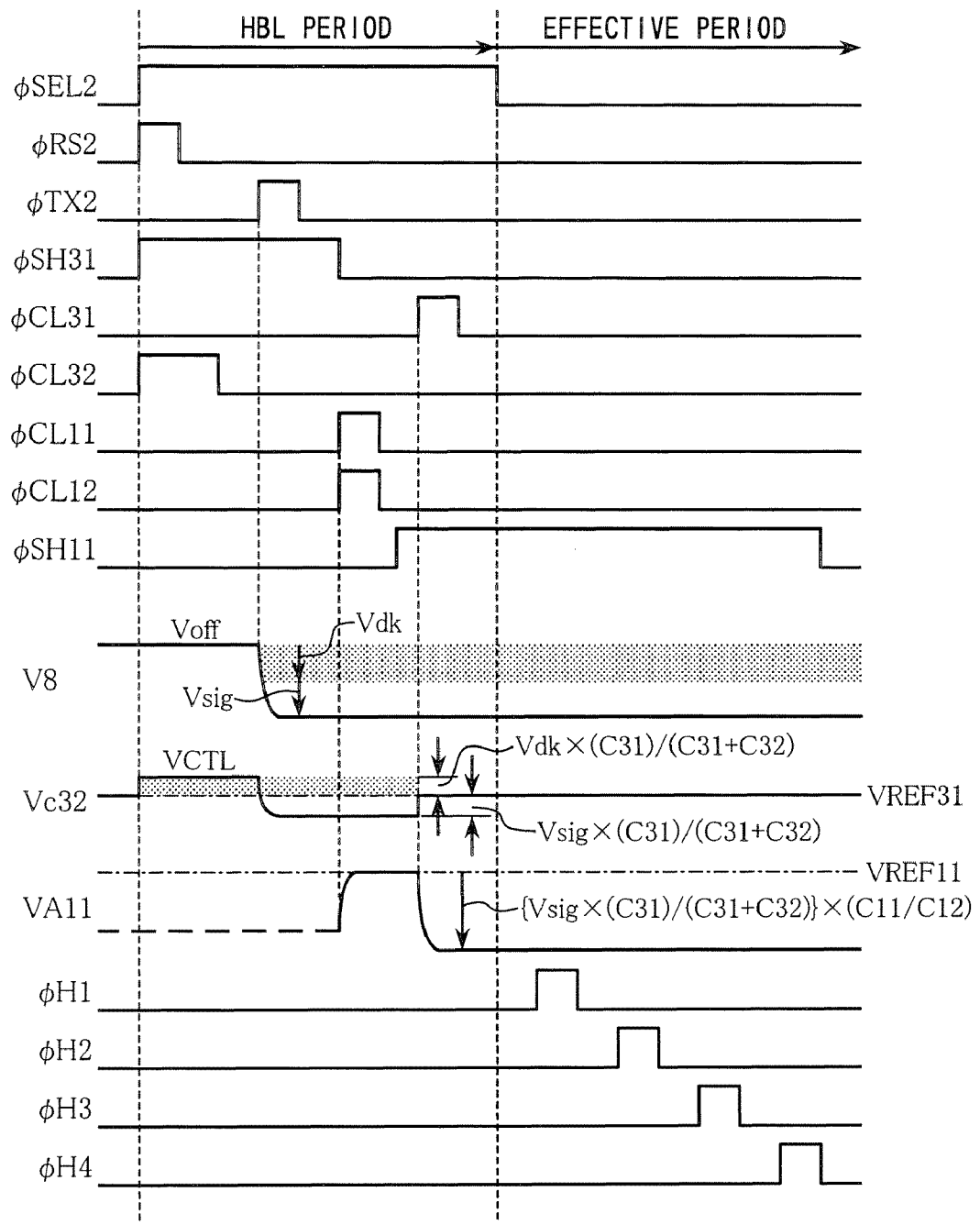
FIG. 7 shows drive timing to explain another mode of operation when selecting effective pixel row of the pixel section shown in FIG. 4.

FIGS. 5 to 7 schematically show drive timing when dark current component is large in the first embodiment of the above construction. Shown here is case where OB pixel row 2a, i.e. the first row and effective pixel row 2b, i.e. the second row from the upper end of the pixel section 2 are selected by the vertical scanning section 3. An operation will now be described of drive timing shown in FIG. 5 to explain operation when OB pixel row 2a is selected. At first reset level is outputted from the pixel cell 1. In particular, the row select transistor M4 is turned ON by driving the row select control signal φ SEL1 to H level to connect between the first pixel row and the vertical signal line 8. At the same time, after turning ON the reset transistor M2 by driving the reset control signal φ RS1 to H level, the reset control signal φ RS1 is brought to L level to turn OFF the reset transistor M2. A reset level of pixel is thereby outputted onto the vertical signal line 8. The output voltage (V8) on vertical signal line 8 when pixel is in reset condition is referred to as Voff.

An operation at this time of the amplifier section with dark current suppressing function 21 will now be described by way of an example of the column circuit on the left end. At first, the dark current suppressing sampling switch SW31 is turned ON by driving the dark current suppressing sampling control signal φ SH31 to H level to connect between the dark current suppressing clamp capacitor C31 and the dark current suppressing sampling capacitor C32. At the same time, the reference voltage reset control signal φ CL31 is driven to H level to turn ON the reference voltage reset switch SW32 so that the dark current suppressing clamp capacitor C31 and the dark current suppressing sampling capacitor C32 are connected to the reference voltage VREF31. Subsequently, the reference voltage reset switch SW32 is turned OFF by bringing the reference voltage reset control signal φ CL31 to L level so that the dark current suppressing clamp capacitor C31 and dark current suppressing sampling capacitor C32 are disconnected from the reference voltage VREF31 and attain high impedance condition. At this time, the dark current suppressing sampling capacitor C32 retains reference voltage VREF31.

Next, a dark current level is outputted from the pixel cell 1. At first, in the condition where connection between the first pixel row and the vertical signal line 8 is kept by continuing H level of the row select control signal φ SEL1, the transfer transistor M1 is turned ON by driving transfer control signal φ TX1 to H level to read dark current component accumulated at photodiode PD. Subsequently, the transfer control signal φ TX1 is brought to L level to turn OFF the transfer transistor M1. The dark current level of pixel is thereby outputted onto the vertical signal line 8. Supposing (−Vdk) as change in output voltage of the vertical signal line 8 from its reset condition to dark current level condition, the output voltage of the vertical signal line 8 in signal level condition is (Voff−Vdk).

The operation of the amplifier section with dark current suppressing function 21 at this time will now be described by way of an example of the column circuit on the left end. Since the connecting point between the dark current suppressing clamp capacitor C31 and the dark current suppressing sampling capacitor C32 is in high impedance state, the output voltage change amount (−Vdk) of the vertical signal line 8 is subject to capacity division between the dark current suppressing clamp capacitor C31 and the dark current suppressing sampling capacitor C32, and is retained at the dark current suppressing sampling capacitor C32. When dark current level is being outputted at this time, voltage Vc32(dk) retained at the dark current suppressing sampling capacitor C32 and output voltage VA31 of the follower amplifier VA31 are represented by the following equation (5).

$$Vc32(dk) = VA31 = VREF31 - \{C31/(C31+C32)\} \times Vdk \quad (5)$$

In this condition, the reset switch SW11 is turned ON by driving the inverting amplifier reset control signal φ CL11 to H level to connect between input terminal and output terminal of the inverting amplifier A11. Further, the precharge switch SW12 is turned ON by driving the precharge control signal φ CL12 to H level to connect the feedback capacitor C12 to the reference voltage VREF11. In addition, the feedback capacitor connection switch SW13 is turned OFF by bringing the feedback capacitor connection control signal φ SH11 to L level to disconnect the feedback capacitor C12 from the output terminal of the inverting amplifier A11.

At this time, the clamp capacitor C11 retains voltage Vc32 (Vdk)=VREF31−{C31/(C31+C32)}×Vdk retained at the dark current suppressing sampling capacitor C32 of dark current level on the basis of reset voltage Vat of the inverting amplifier A11. Further, feedback capacitor C12 retains reference voltage VREF11 on the basis of reset voltage Vat of the inverting amplifier A11. Subsequently, the reset switch SW11 is turned OFF by bringing the inverting amplifier reset control signal φ CL11 to L level to disconnect between the input terminal and the output terminal of the inverting amplifier A11. At the same time, the precharge switch SW12 is turned OFF by bringing the precharge control signal φ CL12 to L level to disconnect the feedback capacitor C12 from the reference voltage VREF11.

Subsequent to this, the feedback capacitor connection switch SW13 is turned ON by driving the feedback capacitor connection control signal φ SH11 to H level to connect between the feedback capacitor C12 and the output terminal of the inverting amplifier A11. At this time, a feedback loop is formed of the inverting amplifier A11 through the feedback capacitor C12 so that the input terminal of the inverting amplifier A11 remains at Vat, and the output voltage VA11 of the inverting amplifier A11 on the other hand attains the voltage accumulated at the feedback capacitor C12. Supposing this condition as reset condition, output voltage VA11(rst-OB) of the inverting amplifier A11 in reset condition is obtained by the following equation (6).

$$VA11(rst-OB) = Vat + (VREF11 - Vat) = VREF11 \quad (6)$$

Further, the reference voltage reset switch SW32 is turned ON by driving the reference voltage reset control signal φ CL31 to H level to connect again the dark current suppressing sampling capacitor C32 to the reference voltage VREF31. Subsequently, the reference voltage reset switch SW32 is turned OFF by bringing the reference voltage reset control signal φ CL31 to L level so that the dark current suppressing clamp capacitor C31 and dark current suppressing sampling capacitor C32 are disconnected from the reference voltage VREF31 and attain high impedance condition. At this time, the dark current suppressing sampling capacitor C32 retains reference voltage VREF31. As a result, change in output Δ VA31 of the output voltage VA31 of the follower amplifier A31 is obtained by the following equation (7).

$$\Delta VA31 = VREF31 - [VREF31 - \{C31/(C31+C32)\} \times Vdk] \quad (7)$$
$$= \{C31/(C31+C32)\} \times Vdk$$

At the same time, since the inverting amplifier A11, clamp capacitor C11, and feedback capacitor C12 act as amplifier having an amplification factor (−C11/C12), the output voltage VA11(sig−OB) of the inverting amplifier of dark current level is obtained by the following equation (8).

$$VA11(sig-OB) = VREF11 + (-C11/C12) \times \{C31/(C31+C32)\} \times Vdk \quad (8)$$

Next in reading signal from the amplifier section with dark current suppressing function 21 out to the horizontal signal line 9, dark current levels of the OB pixel row 2a are sequentially read out from each column through the horizontal select switch SW21 selected by horizontal select signals φ H1, φ H2, . . . outputted from the horizontal scanning section 7. Here, at the dark current correction signal generation section 22, dark current suppression voltage VCTL is set to a value as shown in the following equation (9) in accordance with dark current level.

$$VCTL = VREF31 - \{(C31)/(C31+C32)\} \times Vdk \quad (9)$$

Drive timing for explaining operation when subsequently selecting an effective pixel row 2b is shown in FIG. 6. Since operation at the time of the outputting of reset level from pixel cell 1 of effective pixel row 2b is similar to the operation of OB pixel row 2a except that row select control signal φ SEL2 and reset control signal φ RS2 are controlled, a description thereof will be omitted. Further, operation of the amplifier section with dark current suppressing function 21 is also similar to the operation of OB pixel row 2a, and will not be described.

Next, signal level and dark current level are outputted from pixel cell 1 of the effective pixel row 2b. At first, in the condition where connection between the second pixel row and the vertical signal line 8 is maintained, the transfer transistor M1 is turned ON by driving transfer control signal φ TX2 to H level to read signal component and dark current component accumulated at photodiode PD. Subsequently, the transfer control signal φ TX2 is brought to L level to turn OFF the transfer transistor M1. The signal level and dark current level of pixel cell 1 of the effective pixel row 2b are thereby outputted onto the vertical signal line 8. Supposing −(Vsig+Vdk) as change in output voltage of the vertical signal line 8 from its reset condition to the condition of signal level and dark current level, the output voltage of the vertical signal line 8 in its signal level condition is Voff−(Vsig+Vdk).

The operation of the amplifier section with dark current suppressing function 21 at this time will now be described by way of an example of the column circuit on the left end. At first, the dark current suppressing sampling switch SW31 is turned ON by driving the dark current suppressing sampling control signal φ SH31 to H level to continue connection between the dark current suppressing clamp capacitor C31 and the dark current suppressing sampling capacitor C32. Here, since the connecting point between the dark current suppressing clamp capacitor C31 and the dark current suppressing sampling capacitor C32 is of high impedance, the output voltage change amount [−(Vsig+Vdk)] of the vertical signal line 8 is subject to capacity division between the dark current suppressing clamp capacitor C31 and the dark current suppressing sampling capacitor C32, and is retained at the dark current suppressing sampling capacitor C32. When signal level and dark current level are being outputted at this time, voltage Vc32(sig) retained at the dark current suppressing sampling capacitor C32 and output voltage VA31(sig) of the follower amplifier A31 are represented by the following equation (10).

$$Vc32(sig) = VA31(sig) = VREF31 - \{C31/(C31+C32)\} \times (Vsig+Vdk) \quad (10)$$

In this condition, the inverting amplifier reset switch SW11 is turned ON by driving the inverting amplifier reset control signal φ CL11 to H level to connect between input terminal and output terminal of the inverting amplifier A11. Further, the precharge switch SW12 is turned ON by driving the precharge control signal φ CL12 to H level to connect the feedback capacitor C12 to the reference voltage VREF11. In addition, the feedback capacitor connection switch SW13 is turned OFF by bringing the feedback capacitor connection control signal φ SH11 to L level to disconnect the feedback capacitor C12 from the output terminal of the inverting amplifier A11.

At this time, the clamp capacitor C11 retains voltage Vc32(sig)=VREF31−{C31/(C31+C32)}×(Vsig+Vdk) that is retained at the dark current suppressing sampling capacitor C32 of signal level and dark current level on the basis of the reset voltage Vat of the inverting amplifier A11. Further, feedback capacitor C12 retains reference voltage VREF11 on the basis of reset voltage Vat of the inverting amplifier A11. Subsequently, the reset switch SW11 is turned OFF by bringing the inverting amplifier reset control signal φ CL11 to L level to disconnect between the input terminal and the output terminal of the inverting amplifier A11. At the same time, the precharge switch SW12 is turned OFF by bringing the precharge control signal φ CL12 to L level to disconnect between the feedback capacitor C12 and the reference voltage VREF11.

Subsequent to this, the feedback capacitor connection switch SW13 is turned ON by driving the feedback capacitor connection control signal φ SH11 to H level to connect between the feedback capacitor C12 and the output terminal of the inverting amplifier A11. At this time, a feedback loop is formed of the inverting amplifier A11 through the feedback capacitor C12 so that the input terminal of the inverting amplifier A11 remains at Vat, and the output voltage VA11 of the inverting amplifier A11 on the other hand attains the voltage accumulated at the feedback capacitor C12. Supposing this condition as reset condition, output voltage VA11 (rst−sig) of the inverting amplifier A11 in reset condition is obtained by the following equation (11).

$$VA11(rst-sig) = Vat + (VREF11-Vat) = VREF11 \quad (11)$$

Subsequently, the dark current suppressing reset switch SW33 is turned ON by driving the dark current suppressing reset control signal φ CL32 to H level to connect the dark current suppressing sampling capacitor C32 to the dark current suppression voltage VCTL. After that, the dark current suppressing reset switch SW33 is turned OFF by bringing the dark current suppressing reset control signal φ CL32 to L level so that the dark current suppressing sampling capacitor C32 is disconnected from the dark current suppression voltage VCTL to attain high impedance condition. At this time, the dark current suppressing sampling capacitor C32 retains the dark current suppression voltage VCTL.

As a result, change in output $\Delta$VA31 of the output voltage VA31 of the follower amplifier A31 is obtained by the following equation (12).

$$\Delta VA31 = VCTL - [VREF31 - \{C31/(C31+C32)\} \times (Vsig + Vdk)] \quad (12)$$

From rearrangement by substitution of (9) for (12), the following equation (13) is obtained.

$$\Delta VA31 = \{C31/(C31+C32)\} \times Vsig \quad (13)$$

At the same time, since the inverting amplifier A11, clamp capacitor C11, and feedback capacitor C12 act as amplifier having an amplification factor (−C11/C12), the output voltage VA11(sig) of the inverting amplifier at signal level and dark current level is obtained by the following equation (14).

$$VA11(sig) = VREF11 + (-C11/C12) \times \{C31/(C31+C32)\} \times Vsig \quad (14)$$

As is seen from (14), amplification of the signal component alone is possible.

Next in reading signal from the column amplifier section 5 out to the horizontal signal line 9, signal levels of the effective pixel row 2b are sequentially read out from each column through the horizontal select switch SW21 selected by horizontal select signals $\phi$ H1, $\phi$ H2, . . . outputted from the horizontal scanning section 7.

According to the present embodiment as the above, it is possible even at the time of long time exposure to effectively amplify only signal component at the amplifier section 21 such that dark current level is previously detected at the dark current correction signal generation section 22, and that signal so as to suppress the dark current level is applied on the amplifier section with dark current suppressing function 21. It should be noted that various modifications of the present embodiment are possible. For example, the dark current suppression voltage VCTL of the dark current correction signal generation section 22 can also be set to a value as indicated in the following equation (15) to effect operation at the drive timing as shown in FIG. 7.

$$VCTL = VREF31 + \{(C31)/(C31+C32)\} \times Vdk \quad (15)$$

Of the drive timing shown in FIG. 7, operation at the time of the outputting of reset level from pixel 1 of the effective pixel row 2b is identical to the operation shown in FIG. 6. Further, in operation at the amplifier section with dark current suppressing function 21, the dark current suppressing reset switch SW33 is turned ON by driving the dark current suppressing reset control signal $\phi$ CL32 to H level to connect the dark current suppressing clamp capacitor C31 and the dark current suppressing sampling capacitor C32 to the dark current suppression voltage VCTL. As a result, the dark current suppressing sampling capacitor C32 previously attains a potential which is higher than the reference voltage VREF31 by $\{(C31)/(C31+C32)\} \times Vdk$ corresponding to the dark current level.

Subsequently, signal level and dark current level are outputted from pixel cell 1 of the effective pixel row 2b, and, supposing [−(Vsig+Vdk)] as change amount in output voltage of the vertical signal line 8, the voltage Vc32(sig) retained at the dark current suppressing sampling capacitor C32 and the output voltage VA31(sig) of the follower amplifier A31 are obtained by the following equation (16).

$$Vc32(sig) = VA31(sig) = VCTL - \{C31/(C31+C32)\} \times (Vsig+Vdk) \quad (16)$$

In that condition, the reset switch SW11 is turned ON by driving the inverting amplifier reset control signal $\phi$ CL11 to H level to connect between input terminal and output terminal of the inverting amplifier A11. Further, the precharge switch SW12 is turned ON by driving the precharge control signal $\phi$ CL12 to H level to connect the feedback capacitor C12 to the reference voltage VREF11. In addition, the feedback capacitor connection switch SW13 is turned OFF by bringing the feedback capacitor connection control signal $\phi$ SH11 to L level to disconnect the feedback capacitor C12 from the output terminal of the inverting amplifier A11.

At this time, the clamp capacitor C11 retains voltage Vc32(sig) = VCTL − {C31/(C31+C32)} × (Vsig+Vdk) that is retained at the dark current suppressing sampling capacitor C32 of signal level and dark current level on the basis of reset voltage Vat of the inverting amplifier A11, and the feedback capacitor C12 retains reference voltage VREF11 on the basis of reset voltage Vat of the inverting amplifier A11. Subsequently, the inverting amplifier reset switch SW11 is turned OFF by bringing the inverting amplifier reset control signal $\phi$ CL11 to L level to disconnect between the inverting input terminal and the output terminal of the inverting amplifier A11. At the same time, the precharge switch SW12 is turned OFF by bringing the precharge control signal $\phi$ CL12 to L level to disconnect the feedback capacitor C12 from the reference voltage VREF11.

Subsequent to this, the feedback capacitor connection switch SW13 is turned ON by driving the feedback capacitor connection control signal $\phi$ SH11 to H level to connect between the feedback capacitor C12 and the output terminal of the inverting amplifier A11. At this time, a feedback loop is formed of the inverting amplifier A11 through the feedback capacitor C12 so that the input terminal of the inverting amplifier A11 remains at Vat, and the output voltage VA11 of the inverting amplifier A11 on the other hand attains the voltage accumulated at the feedback capacitor C12. Supposing this condition as reset condition, output voltage VA11(rst−sig) of the inverting amplifier A11 in reset condition is obtained by the following equation (17).

$$VA11(rst-sig) = Vat + (VREF11 - Vat) = VREF11 \quad (17)$$

Next, the reference voltage reset switch SW32 is turned ON by driving the reference voltage reset control signal $\phi$ CL31 to H level to connect the dark current suppressing sampling capacitor C32 to the reference voltage VREF31. After that, the reference voltage reset switch SW32 is turned OFF by bringing the reference voltage reset control signal $\phi$ CL31 to L level so that the dark current suppressing clamp capacitor C31 and the dark current suppressing sampling capacitor C32 are disconnected from the reference voltage VREF31 and attain high impedance condition. At this time, the dark current suppressing sampling capacitor C32 retains the reference voltage VREF31.

As a result, change in output $\Delta$VA31 of the output voltage VA31 of the follower amplifier A31 is obtained by the following equation (18).

$$\Delta VA31 = VREF31 - [VCTL - \{C31/(C31+C32)\} \times (Vsig + Vdk)] \quad (18)$$

From rearrangement by substitution of (15) for (18), the following equation (19) is obtained.

$$\Delta VA31 = \{C31/(C31+C32)\} \times Vsig \quad (19)$$

At the same time, since the inverting amplifier A11, clamp capacitor C11, and feedback capacitor C12 act as amplifier having an amplification factor (−C11/C12), the output voltage VA11(sig) of the inverting amplifier of signal level and dark current level is obtained by the following equation (20).

$$VA11(sig)=VREF11+(-C11/C12)\times\{C31/(C31+C32)\}\times Vsig \quad (20)$$

As is seen from (20), amplification of the signal component alone is possible.

Figure 8:
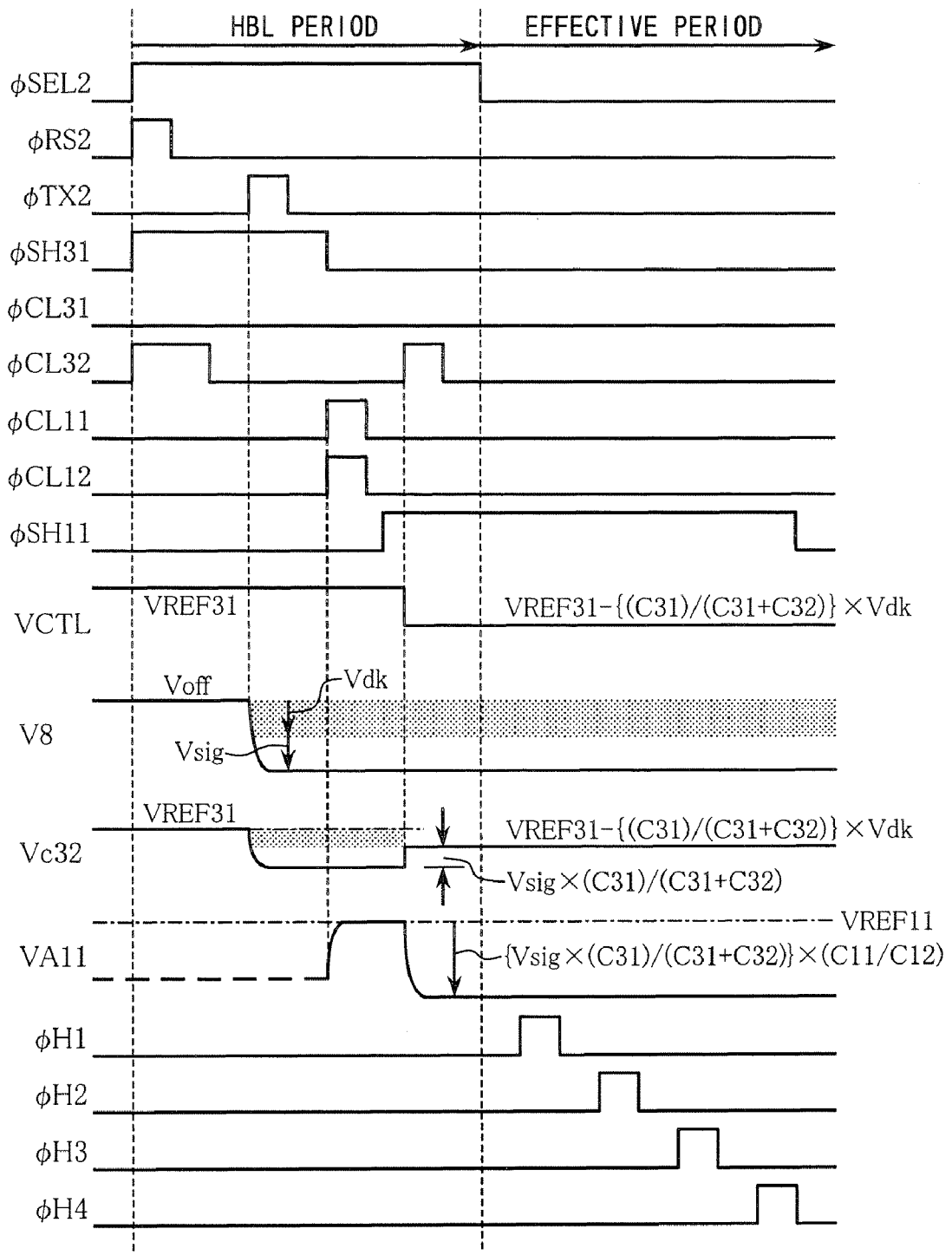
FIG. 8 shows drive timing to explain yet another mode of operation when selecting effective pixel row of the pixel section shown in FIG. 4.

Further instead of switch operation of the reference voltage reset switch SW32 and the dark current suppressing reset switch SW33 to be effected for the suppression of dark current component in the drive timing shown in FIG. 7, operation as shown in drive timing of FIG. 8 is also possible. In particular, the dark current suppression voltage VCTL and the reference voltage VREF31 are generated at the dark current correction signal generation section 22. The output at the dark current correction signal generation section 22 is then switched in accordance with the timing at which the dark current suppression voltage VCTL and the reference voltage VREF31 are applied on the connecting point between the dark current suppressing clamp capacitor C31 and the dark current suppressing sampling capacitor C32, and the dark current suppressing reset control signals φCL32 is applied as pulse form in accordance with such timing. Similar advantages are obtained also by such operation.

Embodiment 2

Figure 9:
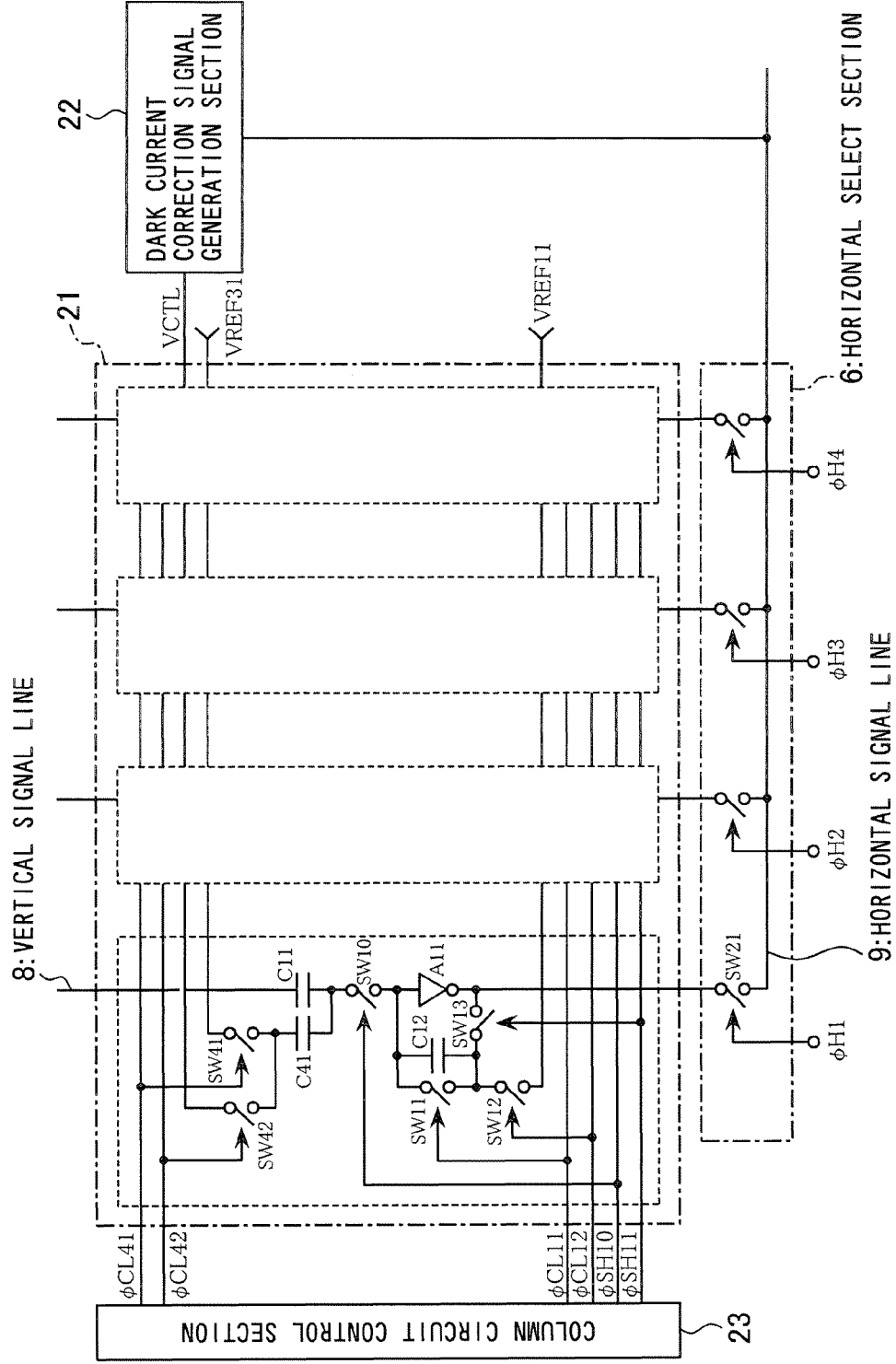
FIG. 9 is a circuit diagram showing construction of an amplifier section having dark current suppressing function in the solid-state imaging apparatus according to a second embodiment.

A second embodiment will now be described. FIG. 9 shows construction of an amplifier section with dark current suppressing function in the solid-state imaging apparatus using amplified MOS sensor according to the second embodiment. In the second embodiment, a subtraction circuit is used for the amplifier section with dark current suppressing function 21 in the first embodiment. The construction of the rest is similar to the first embodiment shown in FIGS. 3 and 4. In particular, the amplifier section with dark current suppressing function 21 according to the second embodiment for each unit column includes: an inverting amplifier A11; a clamp capacitor C11 for retaining reset component of pixel signal; a feedback capacitor C12 for amplifying pixel signal; a sample-and-hold switch SW10 for connecting between the clamp capacitor C11 and an input terminal of the inverting amplifier A11; a precharge switch SW12 for applying reference voltage VREF11 on the feedback capacitor C12; a reset switch for inverting amplifier SW11 for resetting the clamp capacitor C11; a feedback capacitor connection switch SW13 for connecting between the feedback capacitor C12 and the output terminal of the inverting amplifier A11; a reference voltage reset switch SW41 for connecting a dark current suppressing clamp capacitor C41 to reference voltage VREF31; and a dark current suppressing reset switch SW42 for connecting between the dark current suppressing clamp capacitor C41 and a dark current correction voltage VCTL.

The column circuit control section 23 is to output: sample-and-hold control signal φ SH10 for controlling operation of the sample-and-hold switch SW10; inverting amplifier reset control signal φ CL11 for controlling operation of the inverting amplifier reset switch SW11; precharge control signal φ CL12 for controlling operation of the precharge switch SW12; feedback capacitor connection control signal φ SH11 for controlling operation of the feedback capacitor connection switch SW13; reference voltage reset control signal φ CL41 for controlling operation of the reference voltage reset switch SW41; and dark current suppressing reset control signal φ CL42 for controlling operation of the dark current suppressing reset switch SW42.

Figure 10:
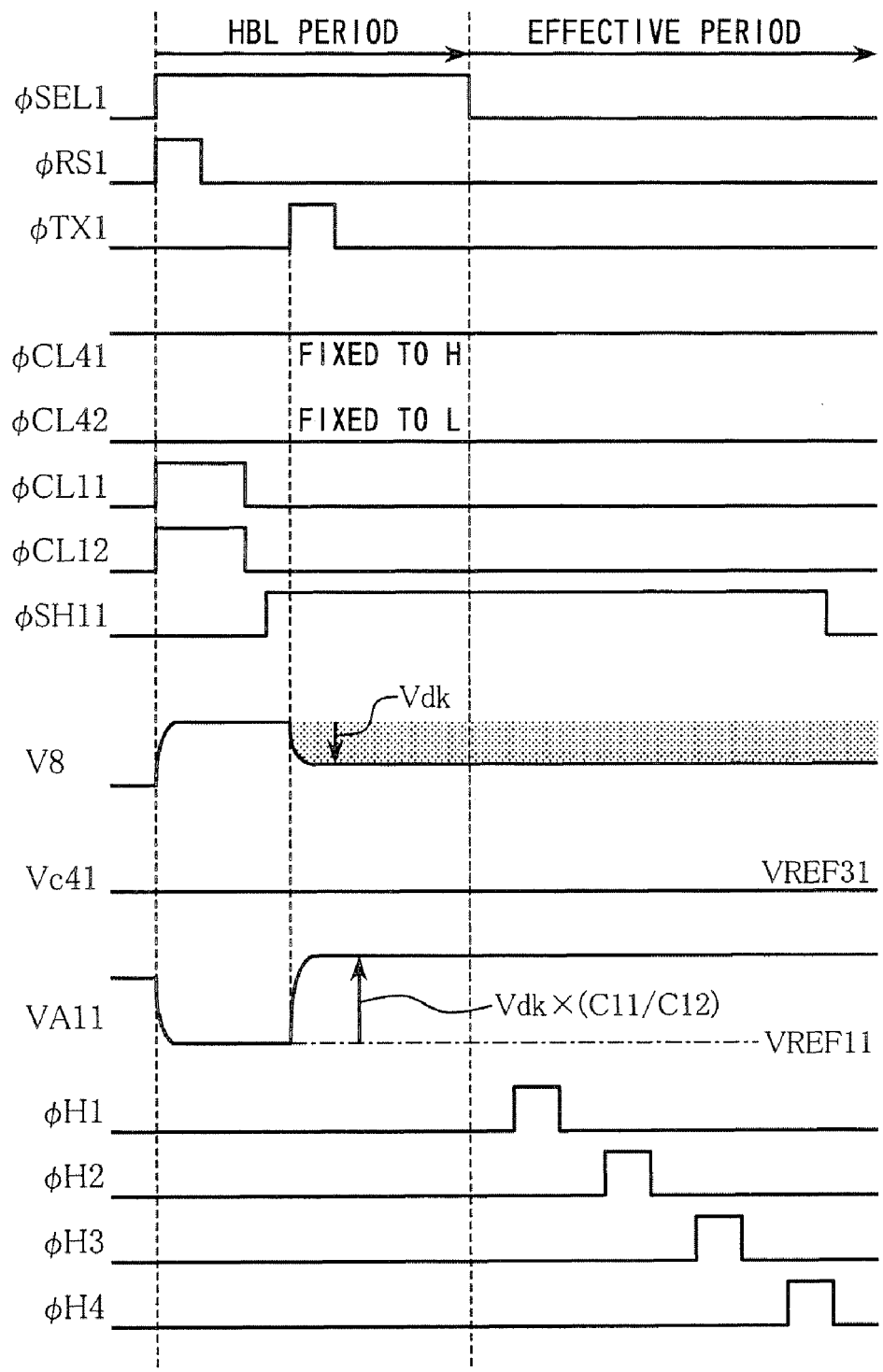
FIG. 10 shows drive timing to explain operation when selecting OB pixel row of the pixel section in the second embodiment.
Figure 11:
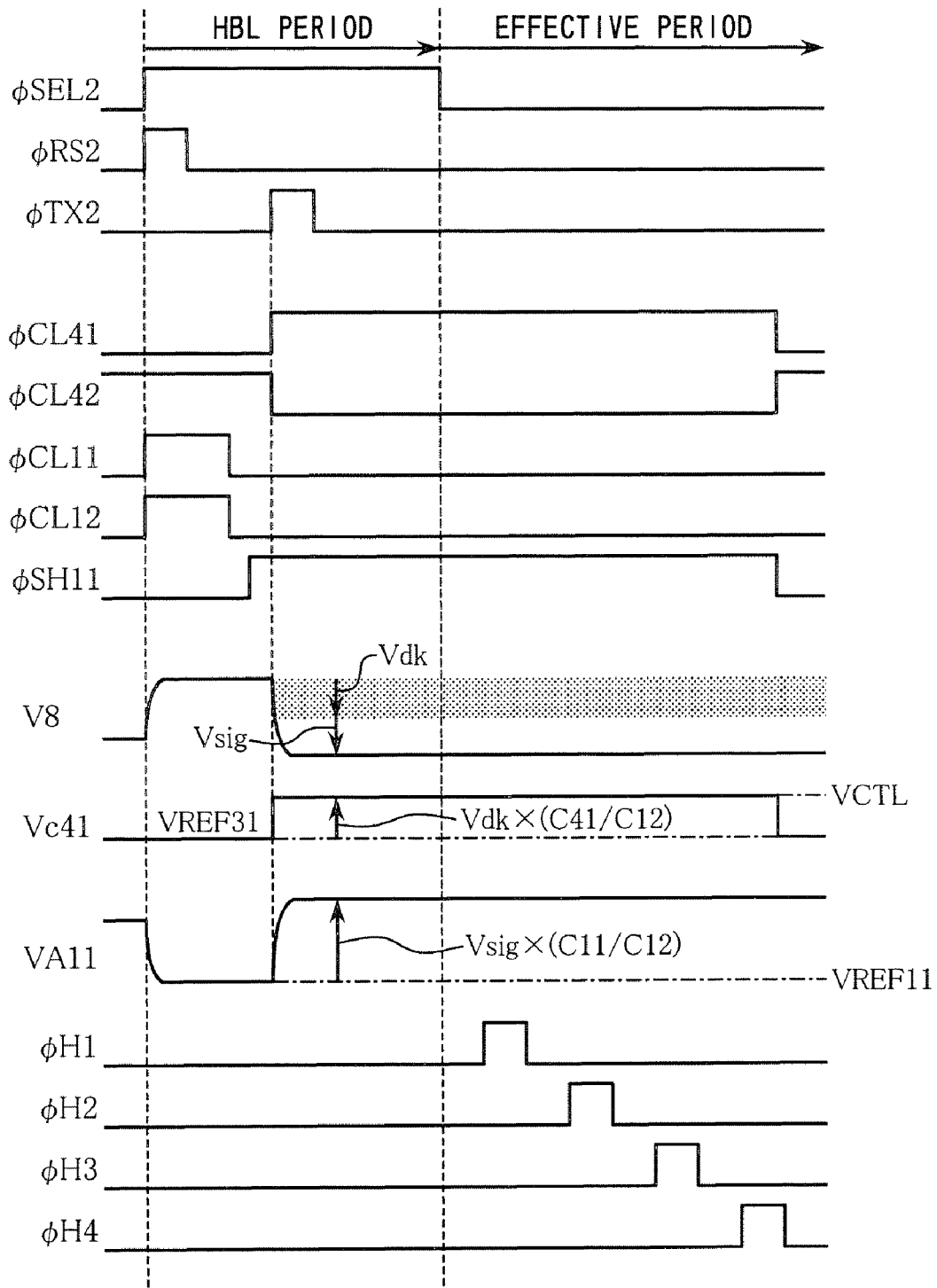
FIG. 11 shows drive timing to explain operation when selecting effective pixel row of the pixel section in the second embodiment.
Figure 12:
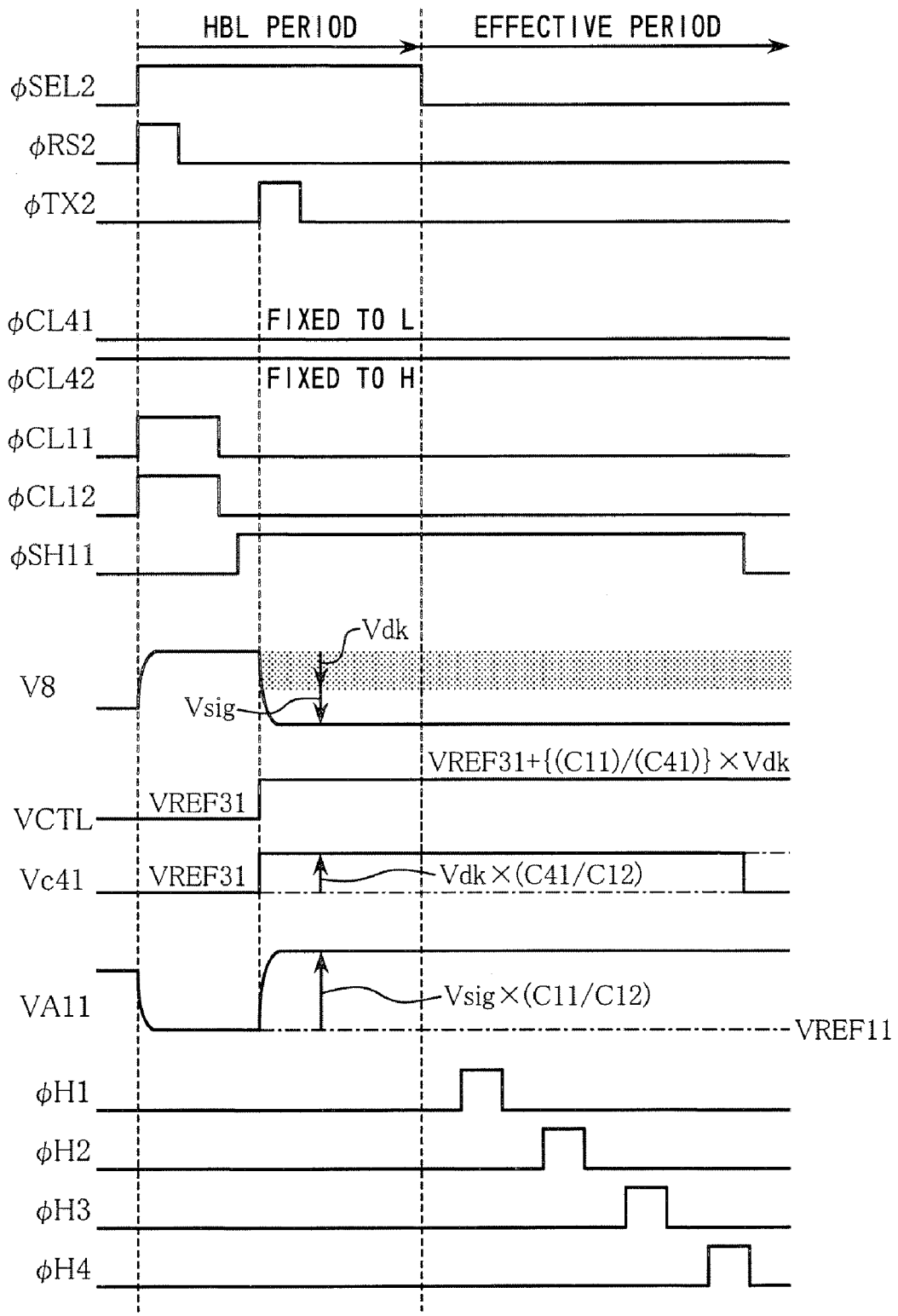
FIG. 12 shows drive timing to explain another mode of operation when selecting effective pixel row of the pixel section in the second embodiment.

FIGS. 10 to 12 schematically show drive timing in the case where dark current component is large. Shown here is case where OB pixel row 2a, i.e. the first row and effective pixel row 2b, i.e. the second row from the upper end of the pixel section 2 are selected by the vertical scanning section 3. The operation at the time of selecting OB pixel row 2a is shown in FIG. 10. At first, reset level is outputted from pixel cell 1. In particular, the row select transistor M4 is turned ON by driving the row select control signal φ SEL1 to H level to connect between the first pixel row and the vertical signal line 8. At the same time, after turning ON the reset transistor M2 by driving the reset control signal φ RS1 to H level, the reset control signal φ RS1 is brought to L level to turn OFF the reset transistor M2. A reset level of pixel cell 1 of the OB pixel row 2a is thereby outputted onto the vertical signal line 8. The output voltage (V8) on vertical signal line 8 when pixel cell 1 is in reset condition is referred to as Voff.

The operation at this time of the amplifier section with dark current suppressing function 21 will now be described by way of an example of the column circuit on the left end. At first, the sample-and-hold switch SW10 is turned ON by driving the sample-and-hold control signal φ SH10 to H level to connect between the clamp capacitor C11 and the input terminal of the inverting amplifier A11. In addition, the reset switch SW11 is turned ON by driving the inverting amplifier reset control signal φ CL11 to H level to connect between the inverting input terminal and the output terminal of the inverting amplifier A11. Further, the precharge switch SW12 is turned ON by driving the precharge control signal φ CL12 to H level to connect between the feedback capacitor C12 and the reference voltage VREF11. At the same time, the reference voltage reset switch SW41 is turned ON by bringing the reference voltage reset control signal φ CL41 to H level (fixed) to connect between the dark current suppressing clamp capacitor C41 and the reference voltage VREF31.

At this time, the clamp capacitor C11 retains output voltage Voff of the vertical signal line 8 in reset condition on the basis of reset voltage Vat of the inverting amplifier A11, and the feedback capacitor C12 retains reference voltage VREF11 on the basis of reset voltage Vat of the inverting amplifier A11. Subsequently, the reset switch SW11 is turned OFF by bringing the inverting amplifier reset control signal φ CL11 to L level to disconnect between the inverting input terminal and the output terminal of the inverting amplifier A11. At the same time, the precharge switch SW12 is turned OFF by bringing the precharge control signal φ CL12 to L level to disconnect between the feedback capacitor C12 and the reference voltage VREF11.

Subsequent to this, the feedback capacitor connection switch SW13 is turned ON by driving the feedback capacitor connection control signal φ SH11 to H level to connect between the feedback capacitor C12 and the output terminal of the inverting amplifier A11. At this time, a feedback loop is formed of the inverting amplifier A11 through the feedback capacitor C12 so that the input terminal of the inverting amplifier A11 remains at Vat, and the output voltage VA11 of the inverting amplifier A11 on the other hand attains the voltage accumulated at the feedback capacitor C12. Supposing this condition as reset condition, output voltage VA11(rst) of the inverting amplifier A11 in reset condition is obtained by the following equation (21).

$$VA11(rst)=Vat+(VREF11-Vat)=VREF11 \quad (21)$$

Next, a dark current level is outputted from pixel cell 1 of the OB pixel row 2a. At first, the row select transistor M4 is turned ON by driving the row select control signal φ SEL1 to H level to connect between the pixel row of the first row and the vertical signal line 8. In this condition, after turning ON the transfer transistor M1 by driving the transfer control signal φ TX1 to H level to read dark current component accumulated at photodiode PD, the transfer transistor M1 is turned OFF by bringing the transfer control signal φ TX1 to L level. The dark current level of pixel cell 1 of the OB pixel row 2a is thereby outputted onto the vertical signal line 8. Supposing (−Vdk) as change in output voltage of the vertical signal line 8 from its reset condition to dark current level condition, the output voltage of the vertical signal line 8 in signal level condition is (Voff−Vdk).

The operation of the amplifier section with dark current suppressing function 21 at this time will now be described by way of an example of the column circuit on the left end. When the vertical signal line 8 is changed by (−Vdk), the inverting amplifier A11, clamp capacitor C11, and feedback capacitor C12 act as amplifier having an amplification factor of (−C11/C12). The output voltage VA11(dk) of the inverting amplifier in signal level condition is thereby obtained as in the following equation (22). It should be noted that, since the condition of the reference voltage reset control signal φ CL41=H is unchanged, the dark current suppressing clamp capacitor C41 has no effect on the output.

$$VA11(dk) = VREF11 + (-C11/C12) \times (-Vdk) \quad (22)$$
$$= VREF11 + (C11/C12) \times (Vdk)$$

Next in reading signal from the amplifier section with dark current suppressing function 21 out to the horizontal signal line 9, dark current levels of the OB pixel row 2a are sequentially read out from each column through the horizontal select switch SW21 selected by horizontal select signals φ H1, φ H2, . . . outputted from the horizontal scanning section 7. Here, at the dark current correction signal generation section 22, dark current suppression voltage VCTL is set to a value as shown in the following equation (23) in accordance with dark current level.

$$VCTL = VREF31 + (C11/C41) \times Vdk \quad (23)$$

Shown in FIG. 11 is the drive timing for explaining operation when subsequently selecting an effective pixel row 2b. Since operation at the time of the outputting of reset level from pixel cell 1 of effective pixel row 2b is similar to the operation of OB pixel row 2a except that row select control signal φ SEL2 and reset control signal φ RS2 are controlled, a description thereof will be omitted. Further, operation of the amplifier section with dark current suppressing function 21 is similar to the operation of the OB pixel row 2a and will not be described except that the reference voltage reset control signal φ CL41 is brought to L level, and that the dark current suppressing reset control signal φ CL42 is driven to H level.

Subsequently, signal level and dark current level are outputted from pixel cell 1 of the effective pixel row 2b. At first, the row select transistor M4 is turned ON by driving the row select control signal φ SEL2 to H level to connect between the pixel row of the second row and the vertical signal line 8. In this condition, the transfer transistor M1 is turned ON by driving the transfer control signal φ TX2 to H level to read signal component and dark current component accumulated at photodiode PD. Subsequently, the transfer control signal φ TX2 is brought to L level to turn OFF the transfer transistor M1. The signal level and dark current level of pixel are thereby outputted onto the vertical signal line 8. Supposing—(Vsig+Vdk) as change in output voltage of the vertical signal line 8 from its reset condition to the signal level and dark current level, the output voltage of the vertical signal line 8 in signal level and dark current level condition is Voff−(Vsig+Vdk).

The operation of the amplifier section with dark current suppressing function 21 at this time will now be described by way of an example of the column circuit on the left end. When the vertical signal line 8 is changed by [−(Vsig+Vdk)], the inverting amplifier A11, clamp capacitor C11, and feedback capacitor C12 act as amplifier having an amplification factor of (−C11/C12). The output voltage VA11(sig) of the inverting amplifier in signal level condition is thereby obtained as in the following equation (24). Further by bringing the reference voltage reset control signal φ CL41 to L level and driving dark current suppressing reset control signal φ CL42 to H level, the change amount Δ Vc41=VCTL−VREF31 of the input terminal voltage of the dark current suppressing clamp capacitor C41 also act as amplifier having an amplification factor of (−C41/C12).

$$VA11(sig) = VREF11 + (-C11/C12) \times (-Vsig-Vdk) + (-C41/C12) \times (VCTL - VREF31) \quad (24)$$

From rearrangement by substitution of (23) for (24), the following equation (25) is obtained.

$$VA11(sig) = VREF11 + (-C11/C12) \times Vsig \quad (25)$$

As is seen from (25), amplification of the signal component alone is possible.

Next in reading signal from the amplifier section with dark current suppressing function 21 out to the horizontal signal line 9, signal levels are sequentially read out from each column through the horizontal select switch SW21 selected by horizontal select signals φ H1, φ H2, . . . outputted from the horizontal scanning section 7.

Further application of signal to the dark current suppressing clamp capacitor C41 to be effected for the suppression of dark current component may also be effected as shown in FIG. 12 instead of switching of the reference voltage reset switch SW41 and the dark current suppressing reset switch SW42. In particular, the dark current suppression voltage VCTL and the reference voltage VREF31 are generated at the dark current correction signal generation section 22. The output at the dark current correction signal generation section 22 is then switched corresponding to the timing at which the dark current suppression voltage VCTL or the reference voltage VREF31 is applied on terminal on the sample-and-hold switch SW10 side of the clamp capacitor C11. Similar advantages are obtained also by such operation.

According to the present embodiment as the above, it is possible even at the time of long time exposure to effectively amplify signal component alone at the above described amplifier section with dark current suppressing function 21 such that dark current level is previously detected at the dark current correction signal generation section 22, and that signal so as to suppress the dark current level is applied on the amplifier section. Further, an increase in the number of devices can be prevented by achieving the dark current suppressing function amplifier section 21 with a subtraction circuit. Also, an excessive time for suppressing dark current component is not required.

Figure 13:
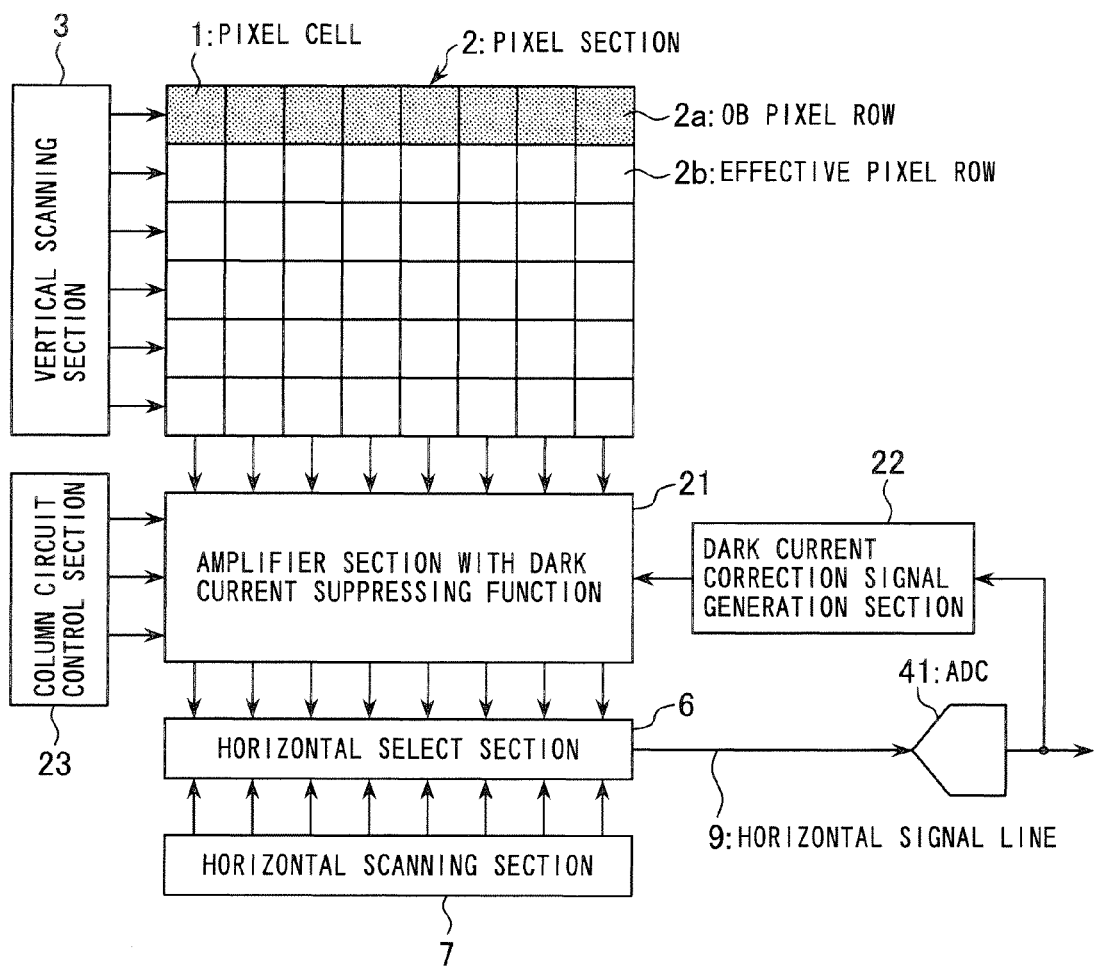
FIG. 13 is a block diagram schematically showing construction of a modification of the first embodiment and the second embodiment.

It is to be noted that various modifications of the circuit construction and drive method in the above described embodiments are possible without departing from the scope of the claims. For example as shown in FIG. 13, dark current level can be detected at the dark current correction signal generation section 22 after converting it into digital signal at ADC (AD converter) 41. In this case, it is possible to readily effect complicated computation that is difficult with analog signal. Further, amplifier gain can be made different between when detecting dark current and when reading signal. Furthermore, change in the constituent components and drive method of unit pixel can also be met by change in the circuit construction and/or drive method of the vertical scanning circuit and/or amplifier section with dark current suppressing function.

According to the first aspect of the invention as has been described by way of the above embodiments, signal for suppressing dark current component is generated based on pixel signal from the horizontal signal line, and the signal is used to suppress dark current component of pixel contained in pixel signal inputted through the vertical signal line. Since the pixel signal after the suppression of dark current component is then amplified, it is possible to effectively amplify the signal component alone. According to the second aspect, it is further possible to handle the above processing operation by addition of simple circuit. According to the third aspect, it is further possible to handle the above processing operation by addition of simple circuit, and to make unnecessary additional processing time for suppressing dark current component. According to the fourth aspect, since dark current level is acquired as digital signal, complicated computation is also readily possible.

What is claimed is:

1. A solid-state imaging apparatus comprising:
a pixel section having pixels two-dimensionally arranged into row direction and column direction, each pixel containing a photoelectric conversion section, an accumulation section for accumulating output of said photoelectric conversion section, an amplification section for amplifying output of said photoelectric conversion section accumulated at said accumulation section and outputting it as pixel signal, and a reset section for effecting reset of said accumulation section;
a vertical scanning section for selecting row to be read out of said pixel section;
vertical signal lines provided correspondingly to columns of said pixel section, onto which pixel signals of pixels arranged in column direction are outputted;
a column amplifier section including an amplifier unit and a suppression signal application unit, said suppression signal application unit disposed in series between said vertical signal line and said amplifier unit;
said suppression signal application unit effecting suppression of a dark current component of said pixels contained in pixel signals inputted through said vertical signal line and said amplifier unit amplifying said pixel signals after the suppression of the dark current component by said suppression signal application unit;
a horizontal scanning section for selecting said pixel signal amplified by said column amplifier section and outputting it onto a horizontal signal line; and
a dark current correction signal generation section for generating and applying on said column amplifier section a signal for suppressing said dark current component based on said pixel signal from said horizontal signal line.

2. The solid-state imaging apparatus according to claim 1, wherein said amplifier unit having an input end and an output end for amplifying and outputting from said output end an output conforming to a difference signal in relation to a second level of said pixel signal corresponding to output of said photoelectric conversion section accumulated at said accumulation section on the basis of a first level of said pixel signal at the time of said reset inputted from said input end; and said suppression signal application unit disposed in series between said vertical signal line and said amplifier unit for applying on said input end of said amplifier unit said signal from said dark current correction signal generation section for suppressing said dark current component after generation of said difference signal.

3. The solid-state imaging apparatus according to claim 1, wherein said amplifier unit having an input end and an output end for amplifying and outputting from said output end an output conforming to a difference signal in relation to a second level of said pixel signal corresponding to output of said photoelectric conversion section accumulated at said accumulation section on the basis of a first level of said pixel signal at the time of said reset inputted from said input end; and said suppression signal application unit for applying said signal for suppressing said dark current component to the inside of said amplifier unit in the vicinity of said input end at the time of amplification of said output conforming to said difference signal.

4. The solid-state imaging apparatus according to claim 1 further comprising AD conversion section for converting said pixel signal outputted from said horizontal signal line into a digital signal, wherein said dark current correction signal generation section generates said signal for suppressing said dark current component based on said digital signal.

* * * * *